United States Patent [19]
Armentrout

[11] Patent Number: 5,245,903
[45] Date of Patent: Sep. 21, 1993

[54] SHAFT CUT OFF GAUGE

[76] Inventor: Raymond C. Armentrout, Rte. 2, Box 258, Macclenny, Fla. 32063

[21] Appl. No.: 937,737

[22] Filed: Sep. 1, 1992

[51] Int. Cl.$^5$ .............................................. B26D 7/01
[52] U.S. Cl. ................... 83/468; 83/468.6; 83/468.7; 83/478
[58] Field of Search .................. 83/468, 468.5, 468.7, 83/467.1, 478, 468.6; 403/346, 347, 354

[56] References Cited

U.S. PATENT DOCUMENTS

| | | | |
|---|---|---|---|
| 195,722 | 10/1877 | Morris | 83/468 |
| 580,658 | 4/1897 | Burnham | 83/468 |
| 1,097,993 | 5/1914 | Sherman | 83/478 |
| 1,419,446 | 6/1922 | Bogert | 403/346 |
| 2,041,051 | 5/1936 | Dallas | 403/346 |
| 2,485,274 | 10/1949 | Garrett | 83/468 |
| 4,412,468 | 11/1983 | Bucy | 83/468 |
| 4,871,156 | 10/1989 | Kozyrski et al. | 83/468 |

*Primary Examiner*—Scott Smith
*Attorney, Agent, or Firm*—Dowell & Dowell

[57] ABSTRACT

A shaft cut off gauge has a base adjustable along a supporting table and a series of spaced slots along the upper edge of an upstanding longitudinal wall for receiving the upper portion of a fence which has a slot in its upper wall and in its lower flange that receives the upper wall of the base in fixed relationship, the fence being mountable in any of various spaced slots to adjust the fence along the base. A combined shaft support and guard is provided for use with the gauge.

7 Claims, 1 Drawing Sheet

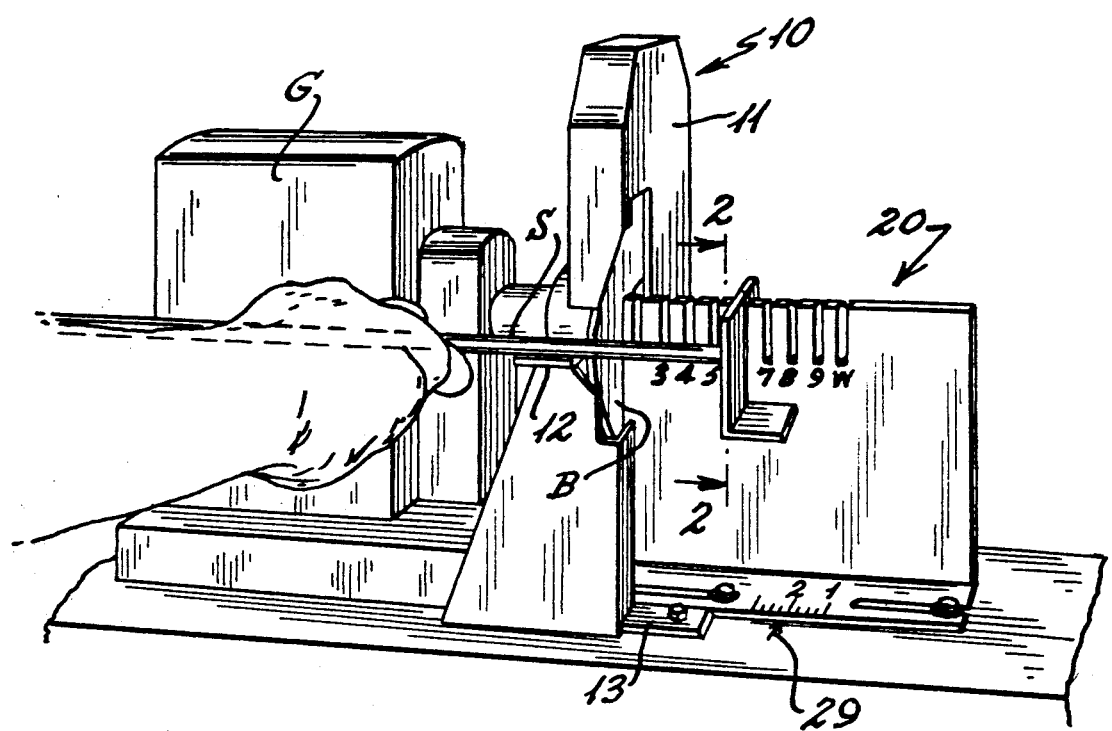
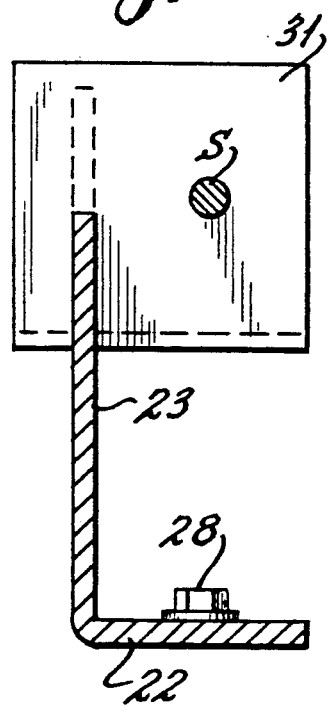
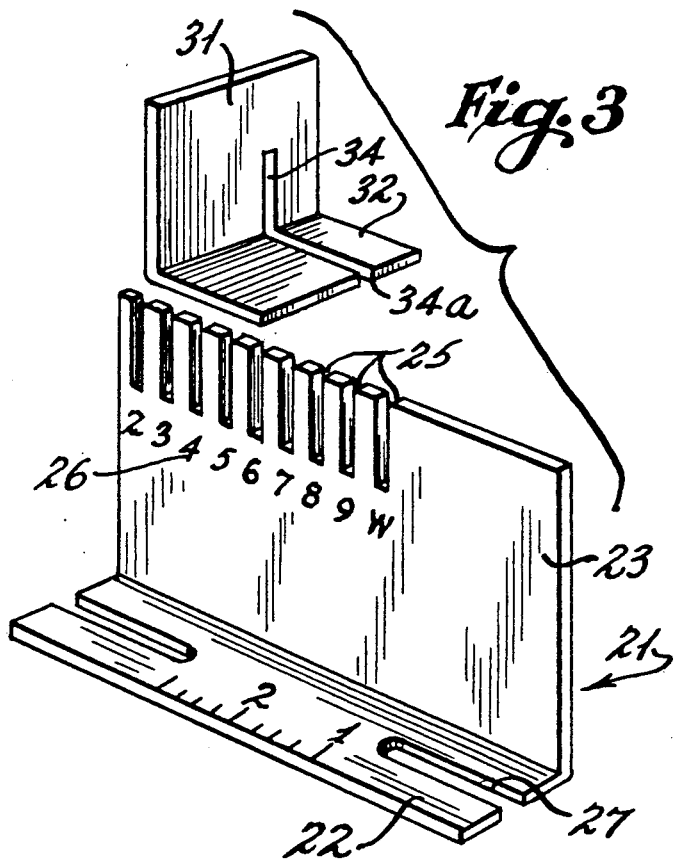

SHAFT CUT OFF GAUGE

BACKGROUND OF THE INVENTION

1. Field of the Invention

This invention relates to gauges that are used in connection with saws for accurately and quickly measuring the length of a work piece which is to be cut off by the saw.

2. History of the Related Art

Various types of saw gauges have been known. In particular the Garrett U.S. Pat. No. 2,485,274 discloses a saw table having a cut off gauge mounted thereon which is adjustable along the length of the table to remove the ends of lumber to a desired length. The patents to Morrell U.S. Pat. No. 4,160,318 and Bucy U.S. Pat. No. 4,412,468 are further illustrative of the art.

SUMMARY OF THE INVENTION

It is an object of the present invention to provide a shaft cut off gauge for a golf club or the like that is simple to use, requiring only that a slot in the fence and a selective slot in the base support be aligned in order to mount the fence at the selected part of the base support.

It is a further object of the invention to provide a cut off saw gauge that is adjustable in length without the need for any fastening elements or tools but which can be adjusted merely by manually separating and reengaging the base an fence elements.

A further object is to provide a single two piece cut off gauge having predetermined positioning elements and which is adjustable and firmly fixed in selective positions of use without any tools or additional elements.

A still further object is to provide a cut off gauge for attachment to a table, the gauge having a fence that is adjustable along a supporting base, and the gauge being adjustable along the table, in order that large variations outside the range of the fence and its base may be made.

It is a further object of the invention to provide a shaft cut off gauge that is easily adjusted and does not require the use of any fastening devices or the like.

DESCRIPTION OF THE DRAWINGS

These and other objects of invention will become apparent from the following description in conjunction with the accompanying drawing, in which;

FIG. 1 is a perspective of the invention illustrating its manner of use;

FIG. 2 is a section on the line 2—2 of FIG. 1; and

FIG. 3 is an exploded illustration of the two portions of the gauge, to an enlarged scale.

DESCRIPTION OF THE PREFERRED EMBODIMENT

With further reference to the drawings there is illustrated a Table T having a bench grinder G with a metal cutting blade B mounted thereon. These are of conventional structure. The blade is partially housed in a guard 10 having side walls 11, a work support 12, and a mounting flange 13.

Positioned adjacent to the blade and guard is a cut off gauge 20 in accordance with the present invention. The gauge has a support portion 21 having a base or flange 22, and an upright portion 23. The upper edge portion of the upright portion 23 has a plurality of notches 25 that are closely and evenly spaced to each other, and have associated indicia, such as numbers 26, in this case the numbers 3, 4, 5, 6, 7, 8, 9, and W corresponding to golfers, irons. The base 22 has spaced longitudinal slots 27 for fasteners 28 permitting adjustment of the support portion 21 along the table with reference to an indicator mark 29 on the table.

A fence 30 has an upright portion 31 and a lower longitudinal flange 32. The flange 32 and the lower part of the upright portion 31 have a connecting slot 34, 34a which is of a width closely to receive the upright portion 23 of the support portion 21. Similarly, the slots 25 of the upright portion are of a width closely to receive the upright portion 31 of the fence. Thus the fence may be easily engaged or disengaged from the upright portion of the upper portion of the gauge at any of the notches 25. When so engaged, the longitudinal and lateral position of the fence is fixed by the interengagement between the edges defining the slot 34 and the upright portion 23, on the one hand, and between the edges defining the slot 25 and the fence upright portion 31, on the other hand. The fence is fixed against any tendency to rotate relative to the support portion by the interengagement between the edges defining the slot 34a in the flange of the fence and the upright portion 23. Thus, the fence is accurately positioned longitudinally and laterally and stabilized angularly against any undesired movement.

In use, for cutting golf irons to length, the gauge and fence are set to a desired position, a stock length golf shaft S is held down against a work support 12 with its end against the fence and the shaft is then manually rotated against the blade until it is cut off. Due to the configuration of the elements the fence may be easily adjusted without the use of fastening elements and requiring only that a single slot in the fence and a selected slot in the base support be aligned.

I claim:

1. A shaft cutoff gauge comprising a base having an upright wall portion and a lower longitudinal flange, said wall portion having a plurality of spaced notches, said notches extending from the upper edge of the wall portion and terminating in spaced relation from the flange, and a fence mounted on the upright wall portion of said base, said fence having an upright portion and a lower longitudinal flange, said flange in spaced relation from the flange of said base, said spaced notches in said base of a width closely to receive the upright portion of said fence, said fence having a slot of a width closely to receive the upright portion of the base, said slot extending across the longitudinal flange of the fence and into the upright portion of said fence, whereby said fence may be mounted on said base at any selected one of said spaced notches, said selected notch in said base wall engaging the upright portion of said fence and the slot in the upright portion of said fence engaging said base wall, thereby fixing a longitudinal and lateral position of said fence upright portion with reference to said base upright portion, and said slot in the flange of said fence engaging said upright wall portion of said base and fixing the angular relationship of said fence upright portion with reference to said base upright portion.

2. The combination of claim 1, in which said slot extends approximately midway into the upright portion of said fence.

3. The combination of claim 1, and indicia adjacent to said spaced notches for indicating the position of said fence with relation to said base.

4. The combination of claim 1, said lower flange of said base mounted in a supporting base and having a longitudinal slot, whereby its longitudinal position with reference to the supporting base may be adjusted.

5. A cut off gauge as defined in claim 1, and a shaft support means mounted in spaced relation from said gauge, said shaft support means having a base mounted on a table adjacent to a cutting blade for supporting the shaft simultaneously against the fence and the blade during the cutting operation.

6. A cut off gauge as in claim 5, in which said shaft support means has an upright wall providing a guard in front of the blade.

7. A cut off gauge as in claim 5, in which the shaft support means is a ledge of a wall member of a size to substantially cover one side of a saw blade, said base supporting said wall member.

* * * * *